United States Patent [19]

Takagi

[11] Patent Number: 4,729,672
[45] Date of Patent: Mar. 8, 1988

[54] ELECTRONIC CLINICAL THERMOMETER

[75] Inventor: Toshiaki Takagi, Fujinomiya, Japan

[73] Assignee: Terumo Kabushiki Kaisha, Tokyo, Japan

[21] Appl. No.: 792,542

[22] Filed: Oct. 29, 1985

[30] Foreign Application Priority Data

Nov. 6, 1984 [JP] Japan .................. 59-232297

[51] Int. Cl.⁴ .................................. G01L 1/08
[52] U.S. Cl. ...................... 374/208; 374/185; 374/163; 277/208; 206/306; 220/DIG. 19
[58] Field of Search ............... 374/183, 163, 170, 185, 374/208, 209; 425/523; 338/28; 206/306; 220/DIG. 19; 277/208

[56] References Cited

U.S. PATENT DOCUMENTS

| | | | |
|---|---|---|---|
| 2,753,714 | 7/1956 | Perkins et al. | 374/185 |
| 2,938,385 | 5/1960 | Mack | 374/183 |
| 3,016,722 | 1/1962 | Batdorf | 277/208 |
| 3,046,028 | 7/1962 | Nathan | 277/208 |
| 3,367,186 | 2/1968 | Ensign | 374/183 |
| 3,578,027 | 5/1971 | Zopfi | 277/208 |
| 3,822,598 | 7/1974 | Brothers | 374/183 |
| 3,832,669 | 8/1974 | Mueller et al. | 338/28 |
| 4,095,810 | 6/1978 | Kulle | 277/208 |
| 4,208,059 | 6/1980 | Fryatt | 277/208 |
| 4,321,029 | 3/1982 | Aoki | 425/523 |
| 4,343,480 | 8/1982 | Vassallo | 277/208 |
| 4,444,517 | 4/1984 | Murase | 374/183 |
| 4,492,548 | 1/1985 | Hubert | 425/523 |
| 4,507,258 | 3/1985 | Aoki | 425/523 |
| 4,538,927 | 9/1985 | Jochemczyk et al. | 374/163 |
| 4,560,973 | 12/1985 | Grimm et al. | 338/28 |

FOREIGN PATENT DOCUMENTS

| | | |
|---|---|---|
| 929332 | 6/1955 | Fed. Rep. of Germany ........ 338/28 |
| 2754090 | 6/1979 | Fed. Rep. of Germany ...... 374/170 |
| 0190734 | 11/1983 | Japan .................. 374/163 |
| 59-116519 | 7/1984 | Japan . |
| 0080730 | 5/1985 | Japan .................. 374/163 |
| 0131432 | 7/1985 | Japan .................. 374/163 |
| 60-219526 | 11/1985 | Japan . |
| 399774 | 3/1966 | Switzerland . |
| 2108890 | 5/1983 | United Kingdom . |

Primary Examiner—Charles Frankfort
Assistant Examiner—Thomas B. Will
Attorney, Agent, or Firm—Frishauf, Holtz, Goodman & Woodward

[57] ABSTRACT

An electronic clinical thermometer including electronic circuitry and a battery housed in an elongate casing having at one end an extended, slender tip provided with a temperature sensing unit covered by a metal cap. The distal end of the slender tip has a plurality of annular ribs around its outer periphery, the annular ribs being covered by the metal cap. The annular ribs and the inner surface of the metal cap define air-filled chambers which prevent liquids from invading the interior of the casing.

15 Claims, 6 Drawing Figures

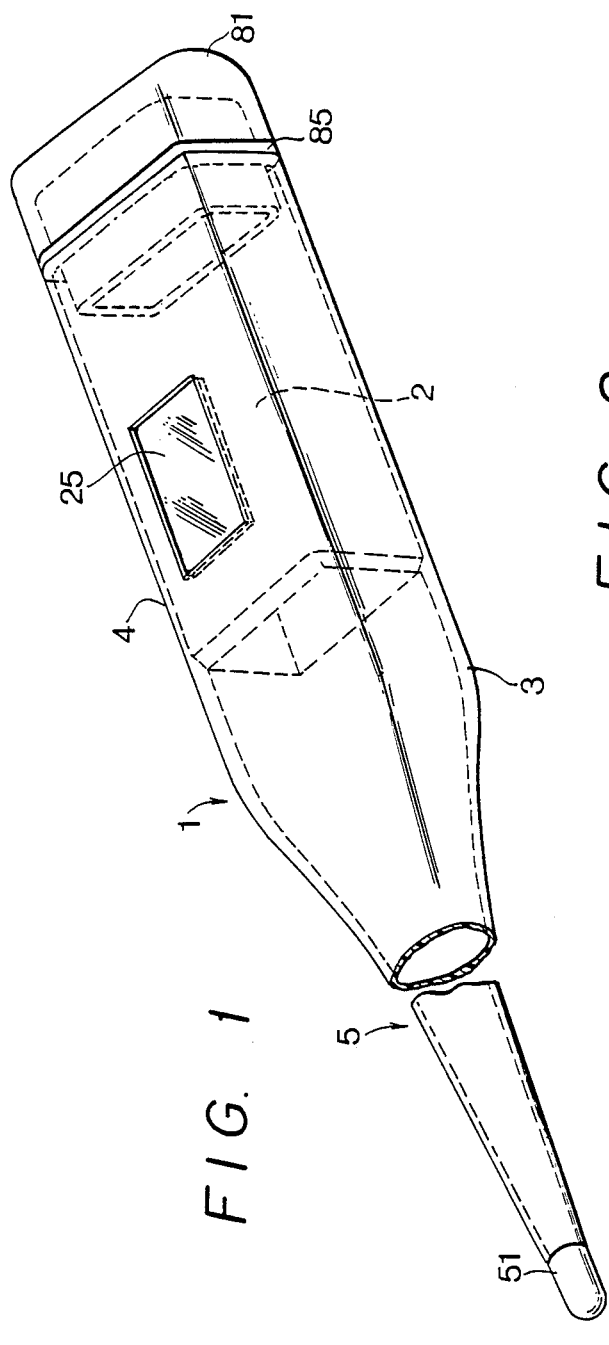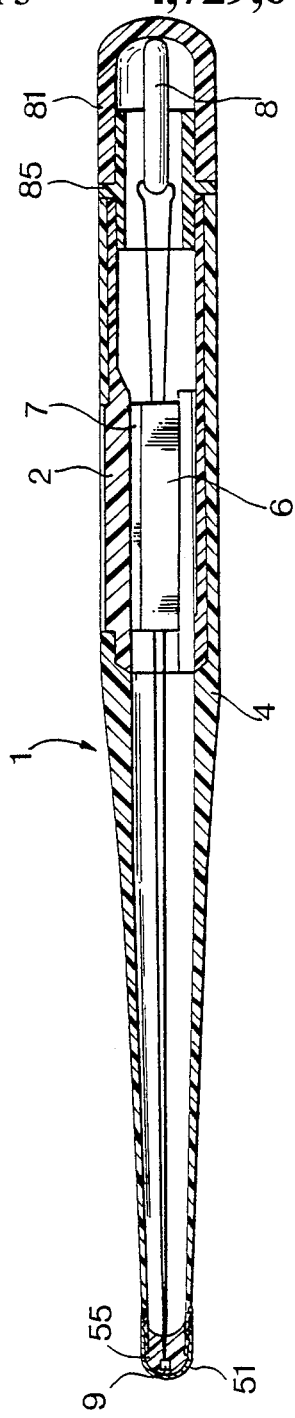

ELECTRONIC CLINICAL THERMOMETER

BACKGROUND OF THE INVENTION

1. Field of the Invention

This invention relates to an electronic clinical thermometer, of approximately the same size as a mercury thermometer and having a water-tight casing, for sensing body temperature electronically and for displaying the temperature in digital form.

2. Description of the Prior Art

An electronic clinical thermometer typically comprises a temperature sensing element which converts body temperature information into an electric signal, a measuring unit for converting the electric signal from the temperature sensing element into a digital signal, an arithmetic unit for computing body temperature from the digital signal, a display unit for displaying the temperature computed by the arithmetic unit, a battery for supplying the abovementioned components with electric power, and a plastic casing for housing these components.

With the miniaturization of LSIs and other electronic components, circuit techniques have made it possible to achieve a significant reduction in the size of electronic clinical thermometers of the foregoing type. When such thermometers are used at institutions such as hospitals and clinics, a treatment such as sterilization or washing of the outer surface of the thermometer is essential in order to prevent the transmission of infection among patients through the medium of the thermometer. Clinical electronic thermometers having a watertight structure which permits such sterilization and washing are now available.

Since the casing of an electronic thermometer includes a number of joints at the location of such parts as a transparent plastic display window through which body temperature is read and a metal cap situated at the tip of the thermometer, it is necessary that these joints be made watertight in order to realize a waterproof structure. To this end, the inventor has succeeded in integrally molding such portions as the display window with the casing proper by a multiple-color injection molding technique, thereby obtaining a perfect waterproof property at these portions. However, achieving a waterproof condition at the temperature sensing tip of the thermometer covered by the metal cap has presented problems. Specifically, the conventional metal cap is attached to the extended, slender tip of the casing by using an adhesive. Since the adhesive cannot be applied evenly and smoothly between the metal cap and the casing, local gaps are formed that allow aqueous solutions to flow into or infiltrate the interior of the casing owing to such phenomena as capillary action. Furthermore, the metal cap tends to separate from the adhesive due to thermal expansion and contraction of the adhesive caused by changes in the outside temperature. This allows aqueous solutions to seep in through small voids which develop between the adhesive and cap.

The foregoing inflow or infiltration of aqueous solutions results in the moisture-induced malfunction of, e.g., a thermistor serving as the thermometer temperature sensor. Another drawback is the trouble involved in assembling the thermometer owing to use of the adhesive.

SUMMARY OF THE INVENTION

An object of the present invention is to provide an electronic clinical thermometer having an improved waterproof property in which the infiltration of water as by capillary action is prevented by providing an air-filled chamber between the thermometer casing and the metal cap covering the tip of the casing without the use of an adhesive.

Another object of the present invention is to provide an electronic clinical thermometer formed to include a temperature display window without use of an adhesive.

Still another object of the present invention is to provide an electronic clinical thermometer having a temperature display window that can be formed with facility.

Still another object of the present invention is to provide an electronic clinical thermometer adapted to prevent the inflow or infiltration of liquids from a temperature display window.

A further object of the present invention is to provide an electronic clinical thermometer capable of being assembled by the press-fitting of the metal cap without use of an adhesive.

A yet further object of the present invention is to provide an electronic clinical thermometer featuring improved thermal conduction between the metal cap and a temperature sensing element, as well as improved impact resistance for the temperature sensing element.

According to the present invention, the foregoing objects are attained by providing an electronic clinical thermometer comprising an elongate casing having an extended slender tip at an end thereof, a metal cap covering a distal end of the extended slender tip, a temperature sensing unit arranged inside the metal cap, electronic circuit means connected to the temperature sensing unit for detecting temperature, and a battery housed in the elongated casing for supplying the electronic circuit means with electric power, the distal end of the extended slender tip having an outer periphery provided with at least two annular ribs, an air-filled chamber being formed between the annular ribs and an inner surface of the metal cap when the annular ribs are covered by the metal cap.

In a preferred embodiment of the present invention, the air-filled chamber is annular in shape and extends toward the distal end of the extended slender tip. The casing comprises an inner case body molded from a transparent resin and an outer case body molded from an opaque resin, the inner case body and the outer case body being formed integral with each other by multiple-color injection molding. The outer case body is partially cut away to form a temperature display window or, alternatively, the inner case body is watertightly formed to include a temperature display window.

The metal cap has an inner diameter smaller than the outer diameter of the annular ribs. The outer diameter of each of the annular ribs is gradually larger in a direction coinciding with a direction in which the metal cap is fitted onto the distal end of the extended slender tip.

A thermally conductive potting material is filled in a space between the metal cap and the temperature sensing unit. A temperature sensing element is fixed inside the potting material. The temperature sensing element is a thermistor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a perspective view illustrating a preferred embodiment of an electronic clinical thermometer according to the present invention;

FIG. 2 is a longitudinal sectional view of the thermometer shown in FIG. 1;

DESCRIPTION OF THE PREFERRED EMBODIMENT

Figure 3:
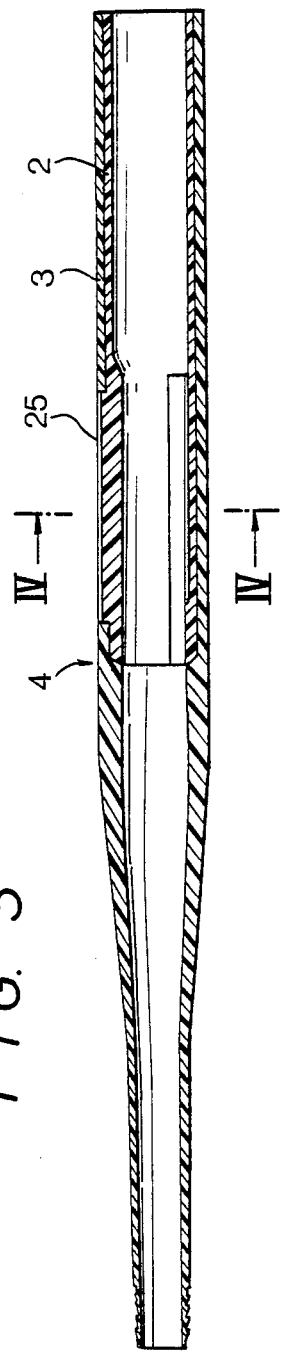
FIG. 3 is a longitudinal sectional view showing a casing in FIG. 2 after the completion of a molding process.

Turning now to the drawings and referring first particularly to FIGS. 1 through 5, an electronic clinical thermometer embodying the present invention indicated generally by the reference numeral 1 includes an elongated casing 4 comprising a transparent inner case body 2 and an outer case body 3. In the illustrated embodiment the transparent inner case body 2 is molded in the form of a cylindrical body by using a multiple-color injection molding machine. The outer case body 3 is then molded from an opaque resin so as to cover the outer surface of the inner case body 2 forming the casing 4. The outer case body 3 is provided with a display window 25.

The outer case body 3 is extended longitudinally to form a slender tip at one end of the casing 4, this end being referred to as a probe end. The distal end of the slender tip is provided with a temperature sensing unit, and a metal probe cap 51 for protecting the temperature sensing unit. The other or base end of the casing 4 is closed by a rear cap 81 attached to the casing via a battery holder 85.

As shown in FIG. 2, the electronic clinical thermometer 1 includes a temperature sensing element 9 such as a thermistor constituting part of the aforementioned temperature sensing unit for converting body temperature information into an electric signal. The element 9 is housed inside the casing 4 at the probe end thereof and is connected to electronic circuit elements including an arithmetic unit 6 powered by a battery 8 accommodated in the battery holder 85. The arithmetic unit 6 converts the electric signal from the temperature sensing element 9 into a digital signal and processes the digital signal so that the sensed temperature may be displayed by a display unit 7. The arithmetic unit 6 may be constituted by known measurement circuitry for providing a direct reading of temperature or for predicting final temperature. Connected between the arithmetic unit 6 and battery 8 is a switching means, not shown, utilizing a magnet reed relay or the like.

For a detailed discussion of the arithmetic unit 6 and display unit 7, not given here, reference should be made to the specifications of U.S. Ser. Nos. 418,287 (July 24, 1984), now U.S. Pat. Nos. 4,461,584; 454,020 (Dec. 28, 1982), now U.S. Pat. Nos. 4,359,954; 504,235 (June 14, 1983), now U.S. Pat. No. 4,592,000; and 561,181 (Dec. 14, 1983), now U.S. Pat. No. 4,574,359.

The arithmetic unit 6, display unit 7, battery 8 and temperature sensing element 9 are housed in the casing 4.

Covering the distal or probe end of the casing 4 is the probe cap 51, made of a metal such as stainless steel or aluminum. A potting material 55 fills the interior of the distal end of casing 4 around the periphery of the temperature sensing element 9 and serves to improve the thermal conduction between the temperature sensing element 9 and the probe cap 51 covering it.

The battery 8 housed in the battery holder 85 at the base end of the casing 4 is retained by the rear cap 81 bonded to the battery holder 85 by an adhesive. The bond can also be achieved by ultrasonic sealing if proper selection of plastic materials is made.

In such case the outer case body 3 constituting the casing 4, the rear cap 81 and the battery holder 85 are formed of an opaque resin, or a resin made opaque by coloring. Examples of such resins are polyethers such as polyphenylene oxide, polyesters such as polyethylene terephthalate and polybutylene terephthalate, acrylic resins such as polyacetal and polymethyl methacrylate, polystyrene resins such as ABS resin, polyolefins such as poly-2-methylpentene and polypropylene, and polycarbonate resin.

The inner case body 2 is formed of a transparent resin. Examples are polystyrene resins such as polystyrene, polyolefins such as poly-2-methylpentene and polypropylene, acrylic resins such as polymethyl methacrylate, cellulose esters such as cellulose acetate, and polyesters such as polyethylene terephthalate.

As mentioned above, the probe cap 51 is made of a metal such as stainless steel or aluminum.

By using the above materials, excellent results can be obtained if the inner case body 2 made of the transparent resin and the outer case body 3 made of the opaque resin are formed integral with each other so that the outer case body 3 contacts the display window 25 of the inner case body 2 liquid tightly. Accordingly, the inner case body 2 can be formed to have a plate-like configuration rather than the cylindrical configuration mentioned above. However, it is preferred that a so-called two-color injection molding operation using a molding machine be adopted to integrate the two case bodies 2, 3, as will be described below, in which case adopting the cylindrical configuration for the inner case body 2 is preferred since this will widen the area of liquid-tight contact and, hence, provide an even greater degree of waterproofness.

Figure 4:
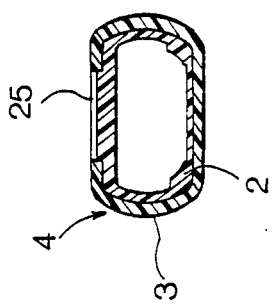
FIG. 4 is a sectional view taken along line IV—IV of FIG. 3.

The display window 25 is formed on the outer side of the inner case body 2 having the cylindrical configuration. It is preferred that the display window 25 be of generally trapezoidal form projecting outwardly from the cylindrical case body 2, as shown in FIGS. 2 through 4. Adopting such an arrangement provides the rim of the window 25 with a step-like portion engaged by the opaque resin case body 3 to form an excellent connection between the two.

A multiple-color injection molding machine, specifically a two-color injection molding machine in the illustrated embodiment, is used to mold the casing 4. The molding process includes molding the cylindrical inner case body 2 and then molding the outer case body 3 to cover the outer surface of the inner case body 2, whereby the case bodies 2, 3 are joined to each other liquid tightly to prevent the intrusion of liquids.

As is well known in the field of plastic molding, the multiple molding process refered to in this specification is performed using injection molding techniques. Therefore, we will describe how these techniques are used to carry out the two-color injection molding process.

A primary injection molding device has a mold including a cavity of a shape which corresponds to the outer wall of the inner case body 2 and a core of a shape which corresponds to the inner wall of the casing 4. Any suitable transparent resin is injected into the mold cavity of the primary injection molding machine. The resulting inner case body 2 together with the core is taken out of the cavity and turned toward a secondary injection molding device.

The secondary injection molding device has a mold defining a cavity of a shape which corresponds to the outer surface of the outer case body 3. The core having the transparent inner case body 2 molded thereon is inserted into the cavity, and a suitable opaque resin is then injected into the cavity. The injected opaque resin intimately contacts or adheres to the inner case body 2 except at the display window 25. The inner case body 2 is thus tightly joined with the outer case body 3 to form a distinctive, but one-piece casing. That is, the inner case body 2 is integrated with the outer case body 3 into a unit, but the distinctive characteristics of each of the plastics are unaffected. The thus integrally molded casing 4 is removed from the cavity together with the core and the core is then removed, obtaining the casing 4 which consists of the inner case body 2 and the outer case body 3 mutually integrated.

FIG. 3 shows the casing molded in this way, and FIG. 4 shows a cross-section taken along lines IV—IV in FIG. 3.

The structure for attaching the probe cap 51 to the distal end of the electronic thermometer 1 will now be described with reference to FIGS. 5 and 6.

Figure 5:
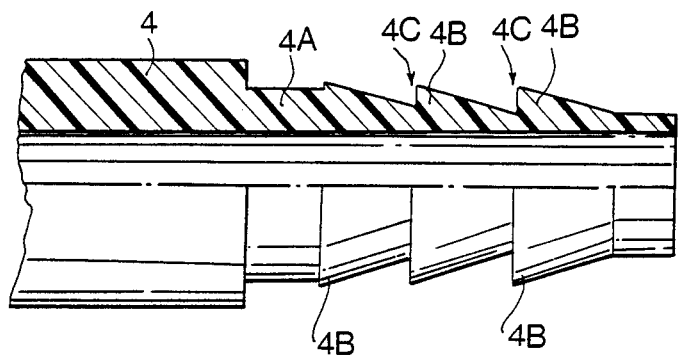
FIG. 5 is an enlarged sectional view showing a distal end portion of a casing constituting the electronic clinical thermometer of FIG. 1.

As shown in FIG. 5, the casing 4 has a tip portion 4A on which is press fitted the probe cap 51 covering the slender, extended front end portion 5 of the thermometer. The outer periphery of the tip portion 4A is formed to include three annular ribs 4B each having a diameter which gradually increases from the front end toward the back end of the casing, thus providing each rib 4B with a generally flared configuration. Each rib 4B has an outer edge portion 4C the diameter whereof is slightly larger than the inner diameter of the probe cap 51.

Figure 6:
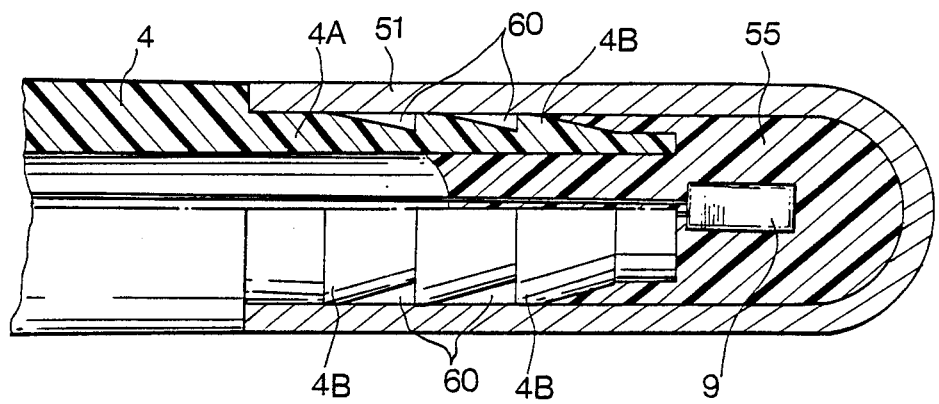
FIG. 6 is an enlarged sectional view showing a metal probe cap press-fitted onto the distal end portion of the casing.

FIG. 6 depicts the probe cap 51 fitted over the tip portion 4A to cover the ribs 4B. As shown, the outer edge portion 4C of each rib 4B where it contacts the inner surface of the probe cap 51 is deformed and flattened, so that the cap 51 fits snugly on the tip portion 4A without leaving any gaps between each rib 4B and the inner surface of the cap. Owing to this pressured contact between the ribs 4B and the inner surface of the cap 51, annular air-filled chambers 60 are formed between the cap 51 and the tip portion 4A. By virtue of this structure, the probe cap 51 is connected to the tip portion 4A liquid tightly, and liquids will not flow or seep into the thermometer through capillary action so long as the air chambers 60 remain intact. The potting material 55 filling the interior of the probe cap contributes to the liquid-tight integrity of the probe cap structure. This assures that the joint between the probe cap 51 and the casing 4 will be waterproof.

It should be noted that at least two ribs 4B are necessary to form the air-filled chamber 60. Increasing the number of ribs 4B produces a greater number of the air-filled chambers 60, thus affording a correspondingly higher degree of liquid tightness.

Let us now describe experiments conducted to ascertain the liquid-tightness of the connection between the probe cap 51 and the casing 4 of the electronic clinical thermometer according to the present invention.

EXPERIMENTAL 1

To check for thermistor malfunction caused by infiltration of liquid at the joint of the probe cap 51, the electronic clinical thermometer of the present invention was soaked for two weeks in aqueous solutions of ethanol, hypal No.20 from Dai Nihon Seiyaku K.K, hibitane (chlorhexidine gluconate) from ICI Pharma K.K, tekysant (sodium hypochlorite) from SHIOE Seiyaku K.K, commercially available diamidol (benzalkonium chloride) and milton. The experimental results revealed absolutely no failure or loss in precision by the thermistor.

EXPERIMENTAL 2

One hundred electronic clinical thermometers in accordance with the present invention and the same number of conventional electronic clinical thermometers having electronic circuitry identical with that of the present invention and using an adhesive to attach the probe cap were soaked for 5 min in an aqueous solution of 0.02% hibitane at a temperature of 55° C. Each thermometer was then extracted from the solution and dried for 5 min. This procedure was repeated for each thermometer to determine the sealing property and waterproofness of the thermometers based on the failure rate (including any deterioration in precision) of the thermometers. The results are shown in the following table.

| Number of repetitions | Failure rate (including loss of precision) | |
|---|---|---|
| | Prior art | Present invention |
| 750 times | 17% | No failures |
| 1250 times | 67% | No failures |

These results demonstrate that the liquidproof properties and durability of the electronic clinical thermometer of the present invention are excellent.

ADVANTAGES OF THE INVENTION

According to the present invention, the annular air-filled chambers 60 are formed at the joint between the metal probe cap 51 and the casing 4, thus preventing the intrusion of liquid through capillary action when the thermometer is sterilized or washed. This assures that the precision of the thermometer will not be adversely influenced by the invasion of liquid. In addition, the temperature display window 25 is formed without using an adhesive, as in the prior art. And since the display window 25 and casing 4 are integrally formed by multiple-color injection molding, the liquidproof properties of the thermometer obtained are excellent. Furthermore, the thermometer can be assembled in a simple manner merely by press-fitting the metal cap 51 onto the end of the casing without use of an adhesive. This provides an electronic clinical thermometer with excellent thermal contact between the metal cap 51 and the temperature sensing element 9.

As many apparently widely different embodiments of the present invention can be made without departing from the spirit and scope thereof, it is to be understood that the invention is not limited to the specific embodiments thereof except as defined in the appended claims.

What is claimed is:

1. An electronic clinical thermometer, comprising:
    an elongated casing formed of a relatively hard polystryrene resin material and having an extended slender tip at a distal end, the casing having a back end opposite said distal end;
    a metal cap having a smooth inner surface being press-fitted over the distal end of said tip in a direction toward the back end of said casing;
    temperature sensing means arranged inside said metal cap;
    electronic circuit means coupled to said temperature sensing means for detecting temperature; and
    a battery housed in said elongated casing for supplying said electronic circuit means with electric power;
    said distal end of said extended slender tip having an outer periphery provided with three spaced apart annular ribs, said annular ribs having portions with an outer diameter greater than the diameter of the inner surface of said metal cap, wherein the outer diameter of each rib gradually increases radially outward along the direction toward the back end of the casing and portions of said outer periphery of said distal end of said extended slender tip between said three adjacent annular ribs have an outer diameter less than the inner diameter of said metal cap, so that said annular ribs and said smooth inner surface of said metal cap define two air-filled liquid-tight chambers between said adjacent annular ribs when said metal cap is fitted onto said distal end of said extended slender tip to cover said annular ribs and said distal end.

2. The electronic clinical thermometer according to claim 1, wherein said air-filled chambers are annular in shape.

3. The electronic clinical thermometer according to claim 1, wherein said casing comprises an inner case body molded from a transparent resin, and an outer case body molded from an opaque resin, said inner case body and said outer case body being formed integral with each other by multiple-color injection molding.

4. The electronic clinical thermometer according to claim 3, wherein said outer case body is partially cut away to form a temperature display window.

5. The electronic clinical thermometer according to claim 3, wherein said inner case body is liquid tightly formed to include a temperature display window.

6. The electronic clinical thermometer according to claim 1, wherein the outer diameter of each of said annular ribs is gradually larger in a direction which coincides with a direction in which said metal cap is fitted onto said distal end of said extended slender tip.

7. The electronic clinical thermometer according to claim 1, comprising a thermally conductive potting material filled in a space between said metal cap and said temperature sensing means.

8. The electronic clinical thermometer according to claim 7, wherein said temperature sensing means includes a temperature sensing element fixed inside said potting material.

9. The electronic clinical thermometer according to claim 8, wherein said temperature sensing element is a thermister.

10. The electronic clinical thermometer according to claim 1, wherein said ribs are deformable when pressed by said metal cap when said metal cap is fitted onto said distal end of said extended slender tip.

11. The electronic clinical thermometer according to claim 1, wherein said metal cap is dimensioned to provide a pressure fit between said metal cap and said annular ribs.

12. The electronic clinical thermometer according to claim 11, wherein said ribs are deformable when pressed by said metal cap when said metal cap is fitted onto said distal end of said extended slender tip.

13. The electronic clinical thermometer according to claim 1, wherein said annular ribs have inclined surfaces which are arranged such that said annular ribs become gradually larger in a direction which coincides with a direction in which said metal cap is fitted onto said distal end of said extended slender tip.

14. The electronic clinical thermometer according to claim 1, wherein said annular ribs are deformable, and said metal cap is substantially non-deformable, whereby said metal cap and annular ribs provide a pressure fit therebetween.

15. The electronic clinical thermometer according to claim 1, wherein the polystyrene resin material of said casing comprises ABS resins.

* * * * *

UNITED STATES PATENT AND TRADEMARK OFFICE
CERTIFICATE OF CORRECTION

PATENT NO. : 4,729,672

DATED : March 8, 1988

INVENTOR(S) : T. TAKAGI

It is certified that error appears in the above-identified patent and that said Letters Patent is hereby corrected as shown below:

Column 4, line 40, "cpaque" should read --opaque--.

Signed and Sealed this

Twenty-fifth Day of December, 1990

Attest:

HARRY F. MANBECK, JR.

*Attesting Officer*  *Commissioner of Patents and Trademarks*